(12) United States Patent
Krupka

(10) Patent No.: US 7,305,050 B2
(45) Date of Patent: Dec. 4, 2007

(54) METHOD AND APPARATUS FOR PROCESSING SIGNALS RECEIVED FROM A CHANNEL HAVING A VARIABLE CHANNEL LENGTH

(75) Inventor: Eyal Krupka, Ramat-Gan (IL)

(73) Assignee: Marvell DSPC Ltd., Pathach Tikva (IL)

( * ) Notice: Subject to any disclaimer, the term of this patent is extended or adjusted under 35 U.S.C. 154(b) by 749 days.

(21) Appl. No.: 10/145,432

(22) Filed: May 13, 2002

(65) Prior Publication Data
US 2003/0210752 A1 Nov. 13, 2003

(51) Int. Cl.
H04L 27/06 (2006.01)
(52) U.S. Cl. .................. 375/340; 375/355; 375/316
(58) Field of Classification Search ........... 375/340, 375/346, 355, 316
See application file for complete search history.

(56) References Cited

U.S. PATENT DOCUMENTS 5,251,237 A * 10/1993 Baier .................. 375/346
6,104,769 A 8/2000 Rainish
6,563,894 B1 5/2003 Rainish
6,907,092 B1 * 6/2005 Yakhnich et al. ......... 375/346
2001/0036235 A1 * 11/2001 Kadous .................. 375/341

OTHER PUBLICATIONS

Cross-spectrum based blind channel identification Pozidis et al. ; Signal Processing, IEEE Transactions on [see also Acoustics, Speech, and Signal Processing, IEEE Transactions on];vol. 45, Issue 12, Dec. 1997 pp. 2977-2992.*

* cited by examiner

Primary Examiner—Mohammed Ghayour
Assistant Examiner—Leila Malek

(57) ABSTRACT

A receiver includes a channel length determination unit to determine a channel length for use by a channel estimator. In at least one embodiment, an iterative process is used to find a channel length (or a combination of channel length and one or more other channel related parameters) that optimizes a channel estimation quality criterion. A time tracking method is also provided that uses an early metric, a center metric, and a late metric to determine an appropriate timing.

21 Claims, 6 Drawing Sheets

```
//V[n] IS THE ESTIMATED VARIANCE OF CHANNEL TAP n
//C1 IS A CONSTANT RELATED TO THE AVERAGE ENERGY OF THE TRANSMITTED SIGNAL
//PER SAMPLE.
//MAX_LEN IS THE NUMBER OF TAPS ESTIMATED IN THE INITIAL CHANNEL ESTIMATION.
//f(Current_Length) IS THE FACTOR BETWEEN THE INPUT NOISE AND THE CHANNEL
//ESTIMATOR ERROR AS A FUNCTION OF CHANNEL LENGTH.
//
for(ifirst=0; ifirst<MAX_LEN; ifirst++){
   for(ilast=ifirst+1; ilast<MAX_LEN; ilast++){
      current_length=ilast-ifirst+1
      Residual_Taps_Energy=0
      for(n=0; n<ifirst; n=n+1)
         Residual_Taps_Energy=Residual_Taps_Energy+V[n];
      for(n=ilast+1; n<MAX_LEN; n=n+1)
         Residual_Taps_Energy=Residual_Taps_Energy+V[n];
      //THE ELEMENT c1*Residual_Taps_Energy IN THE FOLLOWING
      //EQUATION, RESPRESENTS THE CHANNEL ESTIMATION ERROR WHICH IS CAUSED
      //BY TAPS WHICH ARE NOT ESTIMATED.
      Est_Noise=(input_noise+c1*Residual_Taps_Energy)*f(Current_length)
         + Residual_Taps_Energy;
      IF Est_Noise IS THE MINIMUM NOISE FOUND TILL NOW
         KEEP ifirst, ilast AS THE OPTIMAL PARAMETERS
            (optimal_ifirst, optimal_ilast)
   }
}
optimal_timing=optimal_ifirst;
optimal_length=optimal_ilast-optimal_ifirst+1;
```

FIG. 5

METHOD AND APPARATUS FOR PROCESSING SIGNALS RECEIVED FROM A CHANNEL HAVING A VARIABLE CHANNEL LENGTH

BACKGROUND OF THE INVENTION

Channel estimators are often used within wireless receivers to estimate the condition of the wireless channel through which signals were received. Such estimates may then be used during the detection process to, for example, increase the likelihood of accurate detection. To perform the estimation, the channel estimators typically assume a length for the channel being estimated. In the past, channel estimators used an assumed channel length that was fixed and based on a maximum expected channel length. Thus, in many cases, the channel length used by these channel estimators was different from the actual length of the channel being estimated, resulting in an increased level of channel estimation error.

In one prior time tracking technique, an early metric and a late metric are calculated for a received signal for use in determining an optimal sample timing for the signal. This technique assumes that the length of the wireless channel is fixed and known. When the length of the channel is variable and unknown, however, this technique becomes less accurate. For example, if the actual channel is significantly shorter than the assumed channel length, the early and late metrics will have the same values for a wide range of different delays. This may cause the time tracking method to fluctuate.

BRIEF DESCRIPTION OF THE DRAWINGS

FIG. 5 is a program listing illustrating program code for determining optimal parameter values for use by a channel estimator in accordance with an embodiment of the present invention;

DETAILED DESCRIPTION

Figure 1:
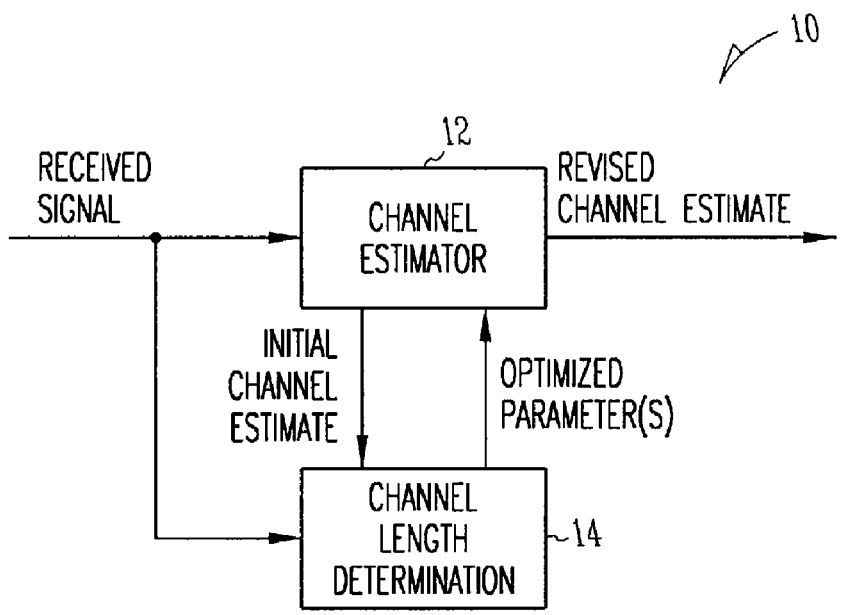
FIG. 1 is a block diagram illustrating a channel estimation subsystem in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the fall range of equivalents to which the claims are entitled. In the drawings, like numerals refer to the same or similar functionality throughout the several views.

The present invention relates to techniques and structures for processing signals within wireless receivers. In one aspect of the invention, techniques and structures are provided for determining channel estimates using a variable assumed channel length. A channel estimator initially determines a first channel estimate for a communication channel based on a first assumed channel length (e.g., a maximum expected channel length). The first channel estimate may then be used to determine a second channel length that will provide enhanced channel estimation performance. The same or a different channel estimator may then determine a second channel estimate for the communication channel based on the second channel length. In one approach, an iterative process is used to determine the second channel length. An optimal sample timing may also be determined. In another aspect of the invention, time tracking is performed within a wireless receiver by generating an early metric, a center metric, and a late metric based on a received signal. In at least one approach, the inventive principles are implemented within a system using time division multiple access (TDMA) based techniques. The inventive principles also have application in systems using other multiple access techniques, including systems using hybrid schemes (e.g., TDMA/FDMA, etc.).

FIG. 1 is a block diagram illustrating a channel estimation subsystem 10 in accordance with an embodiment of the present invention. The channel estimation subsystem 10 may be used within, for example, a wireless receiver to determine a channel estimate for a corresponding wireless communication channel. As illustrated, the channel estimation subsystem 10 includes a channel estimator 12 and a channel length determination unit 14. Using a signal received from the wireless channel, the channel estimator 12 determines an initial channel estimate for the channel based on a first assumed channel length. The channel estimate will typically be made using a portion of the received signal that contains known data (e.g., a training sequence, pilot data, etc.). In at least one embodiment, the first channel length is determined based upon a maximum (worst case) channel length expected in the wireless channel (e.g., equal to or a fixed ratio of the maximum channel length). The channel estimator 12 may use any of a variety of different channel estimation techniques including, for example, a least squares technique, a linear minimum mean square error technique, and others. In at least one embodiment, the channel estimate is determined using the following least squares technique:

$$x = H\theta + w$$

$$\hat{\theta} = (H^H H)^{-1} H^H x$$

$$\underline{h} = \hat{\theta}$$

where x is the received signal at the training sequence, H is the known observation matrix, the row of H contains the known modulated (transmitted) symbols in the training sequence, θ is the unknown channel, w is the noise at the receiver, $\hat{\theta}$ is the estimator of θ, $H^H$ is the hermitian (transpose & complex conjugate) of H, and $\underline{h}$ is the estimated channel. Other channel estimation techniques are also possible.

The channel estimator 12 delivers the initial channel estimate to the channel length determination unit 14 for use in determining a channel length that maybe used to increase the channel estimation performance of the channel estimator 12. The received signal may also be delivered to the channel length determination unit 14. As shown, the channel length determination unit 14 delivers one or more optimized parameters to the channel estimator 12. The optimized parameter(s) will indicate, at a minimum, the channel length determined by the channel length determination unit 14. The optimized parameter(s) may also indicate other values such as, for example, optimal sample timing information. The channel estimator 12 then determines a revised estimate for the wireless channel, using the received signal and the optimized parameter(s). In an alternative approach, another channel estimator is used to determine the revised channel estimate using the received signal and the optimized parameter(s). The revised channel estimate may then be delivered to an equalizer or other structure within the receiver for use in, for example, further processing the received signal.

Figure 2:
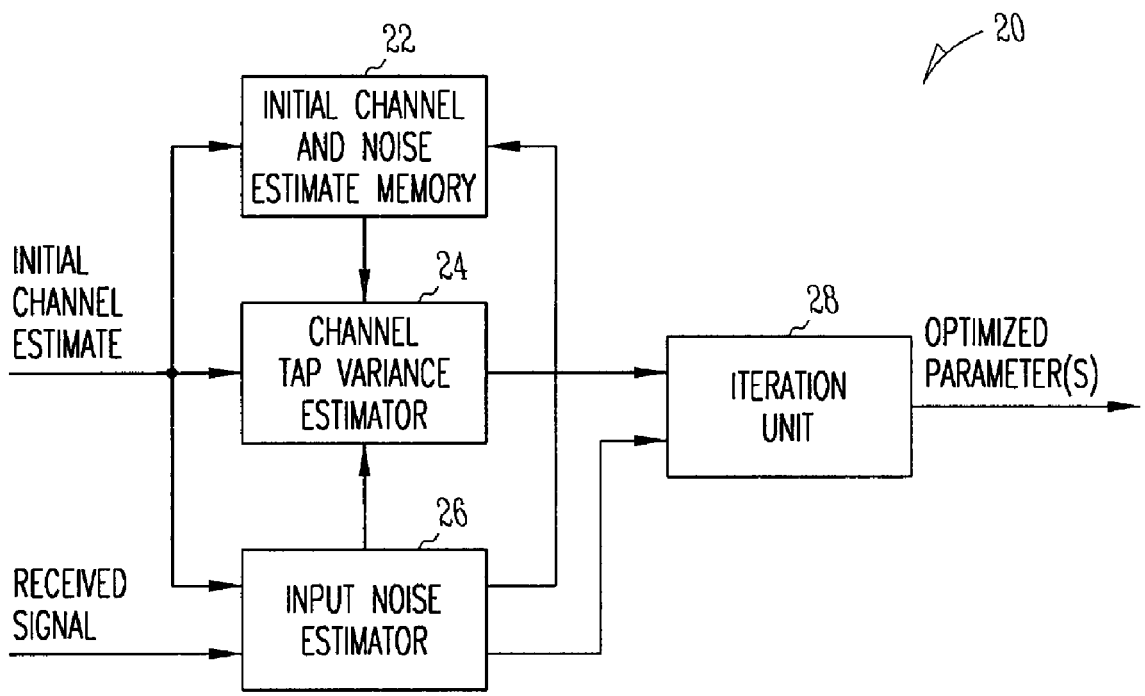
FIG. 2 is a block diagram illustrating functionality within a channel length determination unit in accordance with an embodiment of the present invention.

FIG. 2 is a block diagram illustrating functionality within a channel length determination unit 20 in accordance with an embodiment of the present invention. The channel length determination unit 20 may be used, for example, within the channel estimation subsystem 10 of FIG. 1. As illustrated, the channel length determination unit 20 includes: an initial channel and noise estimate memory 22, a channel tap variance estimator 24, an input noise estimator 26, and an iteration unit 28. The initial channel and noise estimate memory 22 receives and stores the initial channel estimate determined by the channel estimator 12 as well as initial channel estimates previously determined by the channel estimator 12 for the wireless channel. In a system implementing TDMA techniques, for example, the initial channel and noise estimate memory 22 may store an initial channel estimate for each of a number of previous TDMA frames. The initial channel and noise estimate memory 22 also stores noise estimates determined by the noise estimator 26.

The channel tap variance estimator 24 estimates variances for the channel taps of the wireless channel using the latest initial channel estimate and a plurality of previous initial channel estimates stored in the memory 22. In a TDMA system, for example, the initial channel estimates associated with the latest N time slots may be used to estimate the channel tap variances as described below. It is assumed that the channel taps for the training sequence of slot i are independent of the channel taps for the training sequence of slot j (where i≠j) and that the variances of the taps do not change rapidly. The estimated variance $\hat{V}_n$ for channel tap n maybe determined using the following equations:

$$\hat{U}_n = E(h_n * h_n^*)) = \frac{1}{N}\sum_{i=1}^{N} h_n^i h_n^{i*}$$

$$\hat{V}_n = \text{MAX}(\hat{U}_n - c\hat{W}, 0)$$

where $\hat{U}_n$ is a biased estimator of channel tap n variance, $\underline{h}^i_n$ is the estimated tap n of training sequence i, N is the number of training sequences used for estimation, $\hat{W}$ is the estimated mean square error of the channel tap estimate (i.e., the error defined as the difference between the actual tap and the estimated tap), $\hat{V}_n$ is the estimated variance of channel tap n, and c is a constant which may be slightly larger than 1 (e.g. 1.25) in order to truncate taps near the noise level. Other techniques for determining the estimated variance may alternatively be used. In at least one approach, a variance is determined for each channel tap within the initial channel estimate. The channel tap variance estimator 24 delivers the estimated channel tap variances to the iteration unit 28.

The input noise estimator 26 estimates an input noise associated with the communication channel using, for example, the latest initial channel estimate and the received signal. Techniques for estimating channel noise are well known in the art. The input noise estimator 26 delivers the input noise estimate to the iteration unit 28.

The iteration unit 28 uses the channel tap variance information and the input noise information as part of an iterative process to determine one or more optimized parameters for use by the channel estimator. The iteration unit 28 does this by iterating through a number of different parameter values (or parameter value combinations) to identify one or more values that optimize a channel estimation quality criterion. For example, in one embodiment, the iteration unit 28 iterates through a plurality of channel length values to identify a channel length value that results in a lowest channel estimation error. In another embodiment, the iteration unit 28 iterates through a plurality of combinations of channel length and initial sampling point to identify a combination that results in a lowest channel estimation error. As described previously, the optimized parameter(s) may then be delivered to the channel estimator 12 (or another estimator) for use in determining a revised channel estimate for the wireless channel.

Figure 3:
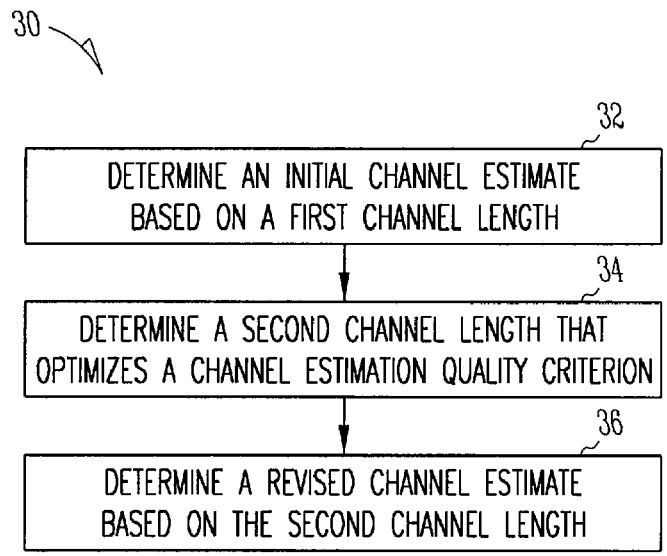
FIG. 3 is a flowchart illustrating a method for determining a channel estimate for a wireless communication channel in accordance with an embodiment of the present invention.

FIG. 3 is a flowchart illustrating a method 30 for determining a channel estimate for a communication channel in accordance with an embodiment of the present invention. As shown, an initial channel estimate is first determined for the channel based on a first channel length (block 32). The first channel length maybe based upon, for example, a worst case channel length that is expected in the wireless channel. Using the initial channel estimate, a second channel length is determined that optimizes a channel estimation quality criterion (block 34). For example, a channel length maybe determined that results in a lowest channel estimation error (or a lowest estimated noise value) from among a plurality of possible channel lengths. In another approach, a combination of channel length and sample timing is determined that results in a lowest channel estimation error from among a plurality of possible combinations. Other techniques are also possible. A revised channel estimate is then determined for the channel based on the second channel length (block 36). The initial channel estimate may be determined using any of a wide variety of available techniques. The channel estimation technique used to determine the revised channel estimate maybe the same as or different from the technique used to determine the initial channel estimate. Likewise, the initial and revised channel estimates may each be determined within a single channel estimator or multiple channel estimators may be employed.

Figure 4:
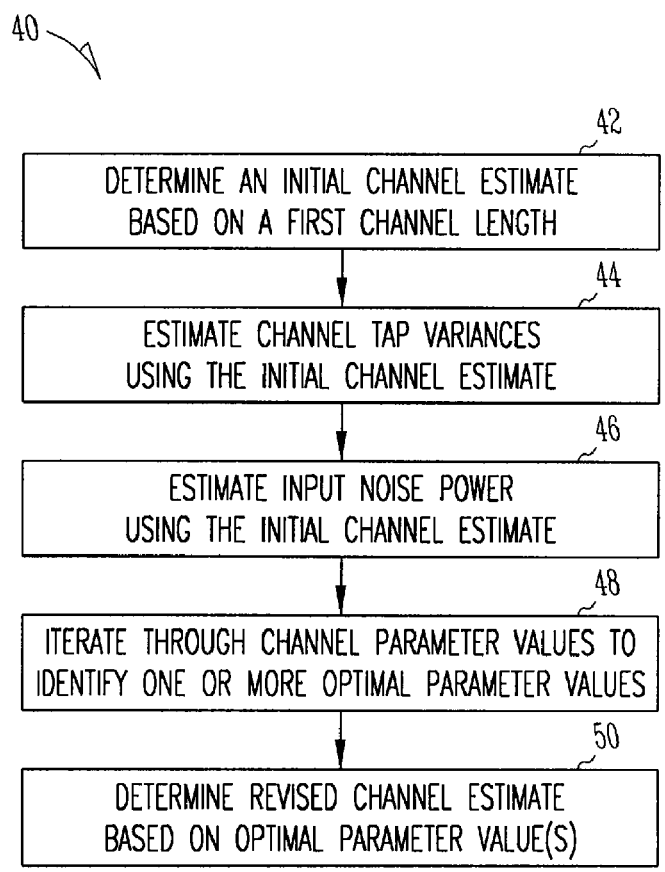
FIG. 4 is a flowchart illustrating a method for determining a channel estimate for a wireless communication channel in accordance with an embodiment of the present invention.

FIG. 4 is flowchart illustrating a method 40 for determining a channel estimate for a wireless communication channel in accordance with an embodiment of the present invention. As illustrated, an initial channel estimate is first determined for the channel based on a first channel length (block 42). The initial channel estimate and previously determined initial channel estimates are then used to estimate channel tap variances for each of the channel taps of the channel (block 44). The initial channel estimate and the received signal are used to estimate an input noise associated with the wireless channel (block 46). This noise estimation may be performed either before, during, or after the channel tap variance estimation. Methods for determining such noise estimates are well known.

An iterative process is next performed to identify one or more channel parameter values that optimize a channel estimation quality criterion (block 48). At least one of the channel parameters for which an optimized value is determined is channel length. Another may be related to, for example, sample timing. The iterative process may make use of both the estimated channel tap variances and the estimated input noise. After the optimal parameter value(s) have been found, a revised channel estimate is determined based on the optimal parameters (block 50). As described above, the channel estimation technique used to determine the revised channel estimate maybe the same as or different from the technique used to determine the initial channel estimate. The revised channel estimate may then be delivered to appropriate functionality within the receiver for use in processing the received signal.

FIG. 5 is a program listing illustrating program code 60 for determining optimal parameter values using an iterative process in accordance with an embodiment of the present invention. As shown, the code 60 includes two outer loops 62, 64 for iterating through a plurality of channel lengths and initial sampling times. The first outer loop 62 increments an initial sample point (ifirst) with each new iteration. The second outer loop 64 increments a last sample point (ilast) with each new iteration. In this manner, every combination of initial sample point and channel length is processed. Within each pass through the second outer loop 64, a residual taps energy is calculated, using the channel tap variance information, for taps outside of the corresponding channel length and timing (see loop 66 and loop 68). An estimated noise measure (Est_Noise) is then calculated (see instruction 70) using the residual taps energy information and the input noise information. The estimated noise measure is indicative of a channel estimation error associated with the corresponding combination of channel length and timing.

The code 60 then compares the present estimated noise measure to all estimated noise measures previously determined to ascertain whether it is the lowest. If the present estimated noise measure is the lowest, the corresponding parameters (ifirst, ilast) are stored, at least temporarily, as the optimal parameter values. When all iterations of the second loop 64 have been performed, the first outer loop 62 changes the initial sampling point (ifirst) and the process is repeated. Eventually, after all combinations of ifirst and ilast have been processed, the optimal values are used to determine the optimal combination of timing and channel length.

It should be appreciated that the program code 60 of FIG. 5 illustrates only one possible iterative technique for determining one or more optimal parameters. For example, as will be appreciated by persons of ordinary skill in the art, channel estimate quality measures other than Est_Noise may be used. In addition, iterative techniques that do not process all possible combinations of initial sampling point and channel length, but only process a subset of these combinations, may be implemented. Furthermore, in at least one embodiment, a timing reference point is assumed for the iterative process (or determined from another source) so that the process only iterates through channel length values to determine an optimal channel length value. Many other iterative techniques may alternatively be used.

In many wireless receivers, time tracking techniques are used to adjust the sampling phase of the receive signal. In one prior time tracking technique, an early metric was calculated for an early portion of a received signal and a late metric was calculated for a late portion of a received signal for use in determining an optimal sample timing for the signal. This technique assumes that the length of the wireless channel is fixed and known. When the length of the channel is variable and unknown, however, this technique becomes less accurate. For example, if the actual channel is significantly shorter than the assumed channel length, the early and late metrics will have the same values for a wide range of different delays. This causes the time tracking method to fluctuate. When the actual channel is shorter than the assumed channel length, it is desired that the sampling be done as late as possible, without losing signal to noise ratio (SNR), so that any new taps that may subsequently appear will be inside the estimated channel. In accordance with one aspect of the present invention, a time tracking method and apparatus is provided that uses a center metric in addition to the early and late metrics to determine an appropriate timing.

Figure 6:
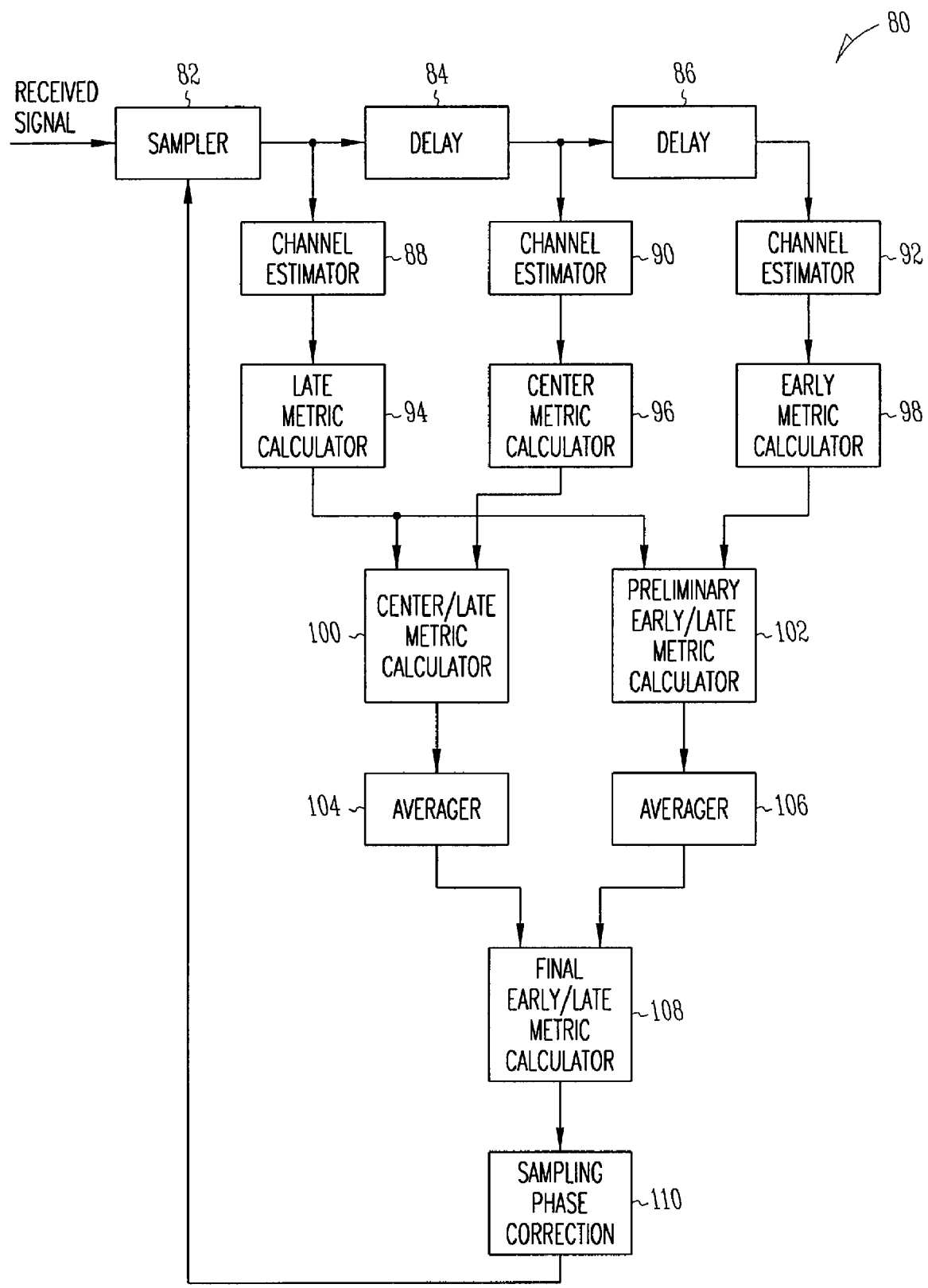
FIG. 6 is a block diagram illustrating an apparatus for performing time tracking within a wireless receiver in accordance with an embodiment of the present invention.

FIG. 6 is a block diagram illustrating an apparatus 80 for performing time tracking within a wireless receiver in accordance with an embodiment of the invention. As illustrated, the apparatus 80 includes: a sampler 82; first and second delay units 84, 86; first, second, and third channel estimators 88, 90, 92; a late metric calculator 94; a center metric calculator 96; an early metric calculator 98; a center/late metric calculator 100; a preliminary early/late metric calculator 102; first and second averagers 104, 106; a final early/late metric calculator 108; and a sampling phase correction unit 110. It should be appreciated that the blocks illustrated in FIG. 6 are functional in nature and do not necessarily represent discrete hardware elements. For example, in at least one approach, one or more of the blocks are implemented in software within a single (or multiple) digital processing device(s). The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Full hardware implementations, hardware/software hybrid implementations, and other implementations may also be used.

The sampler 82 is operative for sampling a signal received from a wireless communication channel. The first delay unit 84 delays the sampled signal by a first delay value and the second delay unit 86 further delays the sampled signal by a second delay value. The first and second delay values may be the same or different. The first, second, and third channel estimators 88, 90, 92 each determine a channel estimate for the wireless communication channel using a different portion of the received signal. That is, the first channel estimator 88 acts upon a late portion of the received signal, the second channel estimator 90 acts upon a c enter portion of the received signal, and the third channel estimator 92 acts upon an early portion of the received signal. In at least one approach, the first, second, and third channel estimators 88, 90, 92 each assume the same channel length to determine a corresponding channel estimate. The late metric calculator 94 calculates a late metric based on the channel estimate corresponding to the late portion of the received signal.

Likewise, the center metric calculator 96 calculates a center metric based on the channel estimate corresponding to the center portion of the received signal and the early metric calculator 98 calculates an early metric based on the channel estimate corresponding to the early portion of the received signal. The center/late metric calculator 100 then calculates a center/late metric using the center metric and the late metric and the preliminary early/late metric calculator 102 calculates a preliminary early/late metric using the early metric and the late metric.

The first averager 104 averages the center/late metric over a number of input frames of the receiver. Similarly, the second averager 106 averages the preliminary early/late metric over a number of input frames. By averaging the metrics over a number of input frames, the accuracy of the time tracking may be enhanced. However, this averaging is not mandatory. The final early/late metric calculator 108 calculates a final early/late metric based on the preliminary early/late metric and the center/late metric (whether averaged or not). The sampling phase correction unit 110 then determines a sampling phase correction value for delivery to the sampler 82 based on the final early/late metric. In an alternative approach, the sampling phase correction unit 110 determines a sampling phase correction value directly using the preliminary early/late metric and the center/late metric (whether averaged or not) without the intervening calculation of a final early/late metric.

In at least one implementation, the first and second delay units 84, 86 each have a delay of $T_S/4$, where $T_S$ is the symbol length associated with the received signal. In such an implementation, the sample timing of the first, second, and third channel estimators 88, 90, 92 may be represented as $T_0-T_S/4$, $T_0$, and $T_0+T_S/4$, respectively, where sample timing $T_0$ represents the timing being tracked. The metric that is used by the late, center, and early metric calculators 94, 96, 98 will typically be related to communication quality. In one approach, for example, the metric estimates the uncoded bit error rate and is calculated as follows:

$$\text{metric}(T_n) = 0.5 * \exp(-K\_BER * SNR(T_n))$$

where $T_n$ is the sample timing, K_BER is a constant (e.g., 0.6 in one embodiment), and $SNR(T_n)$ is the signal to noise ratio associated with the corresponding sample timing. The signal to noise ratio information may be estimated as follows using the corresponding channel estimate:

$$SNR(T_n) = \frac{\sum_j |h_{opt,j}(T_n)|^2}{C(y(T_n), \underline{h}_{opt}(T_n))},$$

where C is the noise power estimate, y are the input samples sampled at the symbol rate, and $\underline{h}_{opt}$ are the optimal channel taps. The noise power may be estimated as follows:

$$C(y(T_0), \underline{h}) = \sum_{m=1}^{N_S} \left| y_{T_0,m} - \sum_j h_j S_{m-j} \right|^2$$

where $N_S$ is the number of symbols used from the training sequence and S are the symbols of the training sequence. The above-described metric is high for low signal to noise ratios and low for high signal to noise ratios.

In one approach, the preliminary early/late metric calculator 102 calculates the preliminary early/late metric as follows:

$$\text{prel}.EL\text{metric} = \text{metric}(T_0 - T_S/4) - \text{metric}(T_0 + T_S/4)$$

and the center/late metric calculator 100 calculates the center/late metric as follows:

$$CL\text{metric} = \text{metric}(T_0) - \text{metric}(T_0 + T_S/4) + K_b * (0.5 - \text{metric}(T_0 + T_S/4))$$

where $K_b$ is a constant. The final early/late metric calculator 108 may then calculate the final early/late metric as:

$$\text{final}EL\text{metric} = \text{prelim}.EL\text{metric} + \max(CL\text{metric}, 0)$$

where max(A, B) returns the larger of A and B and prelim EL metric and CL metric may be averaged over a number of frames.

Figure 7:
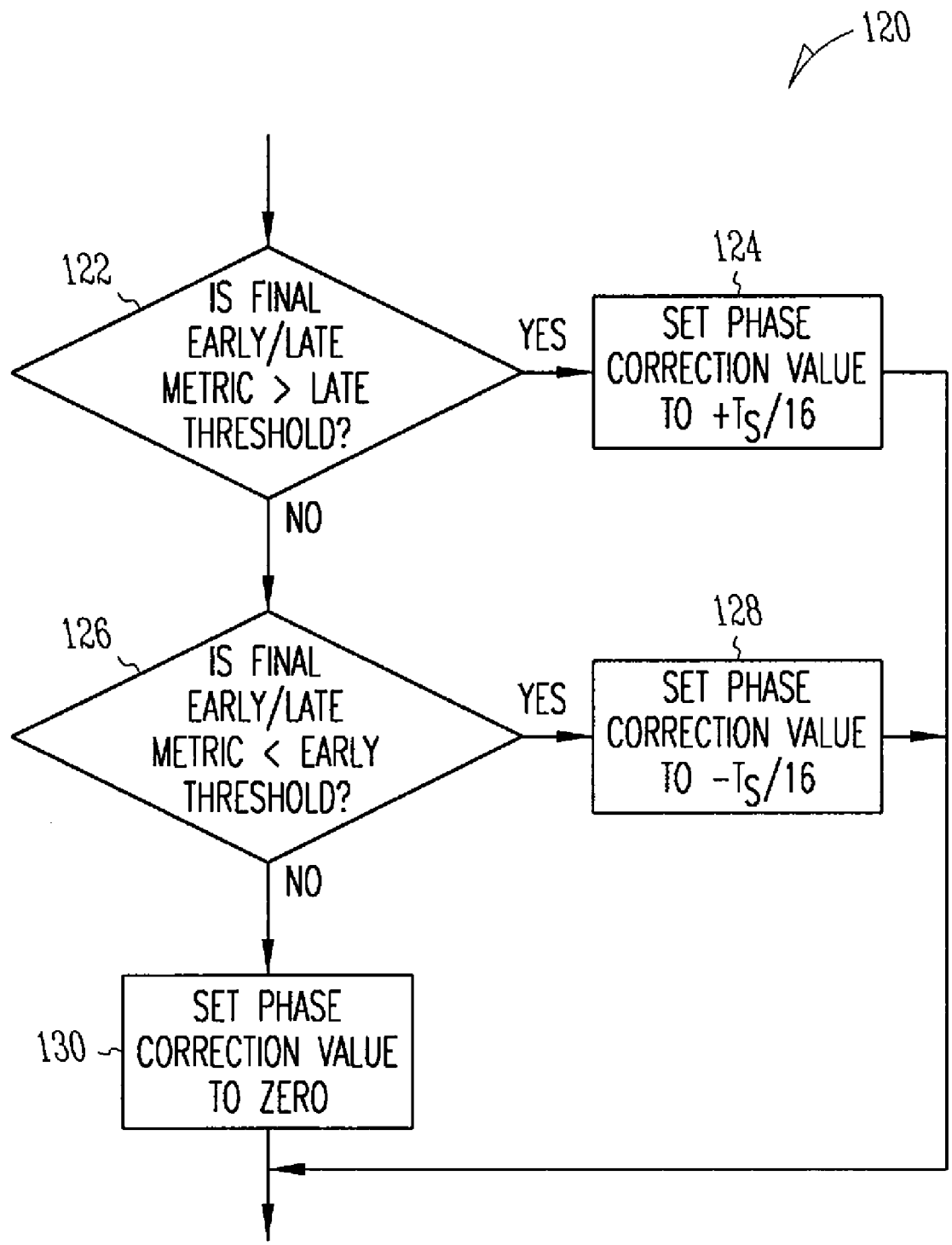
FIG. 7 is a flowchart illustrating a method for selecting a sampling phase correction value using a final early/late metric in accordance with an embodiment of the present invention.

In one embodiment of the invention, the sampling phase correction unit 110 selects a sampling phase correction value based on the final early/late metric. The selected sampling phase correction value is then used to correct the sampling phase of the sampler 82. FIG. 7 is a flowchart illustrating a method 120 for selecting a sampling phase correction value using the final early/late metric in accordance with an embodiment of the invention. As illustrated, it is first determined whether the final early/late metric is greater than a late threshold value (block 122). If so, it is determined that the sampling needs to be done later and the phase correction value is set to a positive value (e.g., $+T_S/16$ in the illustrated embodiment) (block 124). If the final early/late metric is not greater than the late threshold value, it is next determined whether the metric is less than an early threshold value (block 126). If so, it is determined that the sampling needs to be done earlier and the phase correction value is set to a negative value (e.g., $-T_S/16$ in the illustrated embodiment) (block 124). Otherwise, the phase correction value is set to zero (block 130). In one approach, the late threshold is a small positive value and the early threshold is a small negative value (e.g., +/−0.001). In another approach, zero is used as both the early and the late threshold.

In effect, the above described system operates as follows. If the center/late metric is negative (e.g., the center metric is lower than the late metric by more than a predetermined amount), then the time tracking is performed in a manner similar to the conventional early/late time tracking method. This is because the value of max(CL metric, 0) is equal to zero and, therefore, the final EL metric is equal to the preliminary EL metric. If the center/late metric is positive, it is added to the preliminary EL metric and thus moves the decision toward a later sampling. Optimal values may be determined for the various constants described above (e.g., K_BER, $K_b$, number of sampling frames, early and late threshold, etc.) using simulation.

Figure 8:
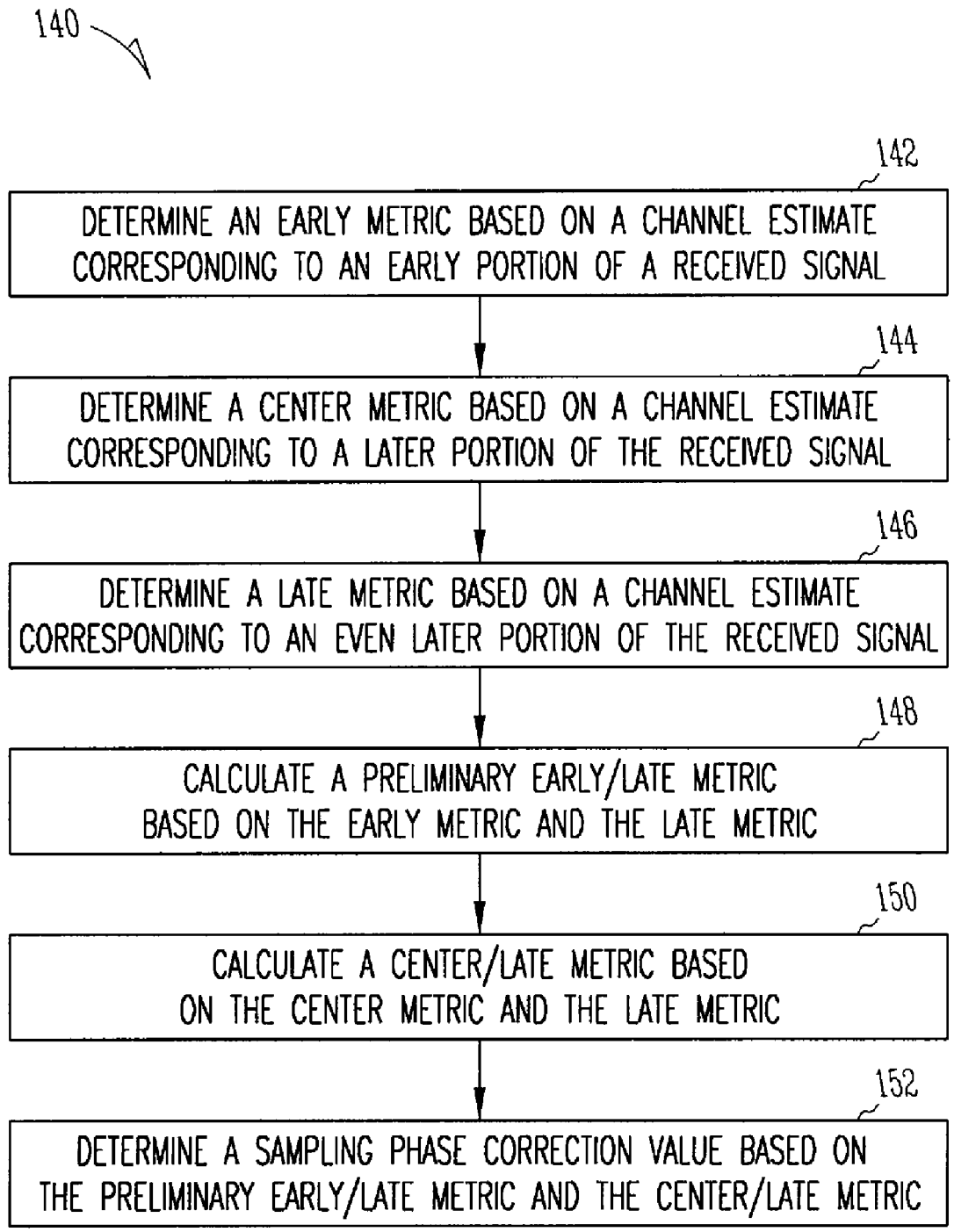
FIG. 8 is a flowchart illustrating a method for performing time tracking within a wireless receiver in accordance with an embodiment of the present invention.

FIG. 8 is a flowchart illustrating a method 140 for performing time tracking within a wireless receiver in accordance with an embodiment of the present invention. An early metric is determined based upon a channel estimate corresponding to an earlier portion of a received signal (block 142). A center metric is determined based upon a channel estimate corresponding to a central portion of the received signal (block 144). A late metric is determined based upon a channel estimate corresponding to a late portion of the received signal (block 146). A preliminary early/late metric is calculated based on the early metric and the late metric (block 148). A center/late metric is calculated based on the center metric and the late metric (block 150).

A sampling phase correction value is then determined based on the preliminary early/late metric and the center/late metric (block 152). In one approach, the preliminary early/late metric and the center/late metric are used to determine a final early/late metric which is then used to select one of a plurality of predetermined sampling phase correction values. In another approach, the preliminary early/late metric and the center/late metric are used to directly calculate (or to select) a sampling phase correction value. Other techniques for determining the sampling phase correction value using the calculated metrics may alternatively be used.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for determining a channel estimate for a communication channel comprising:
   receiving a wireless signal at a channel estimator and a channel length determination unit, wherein each of the channel estimator and the channel length determination unit independently receive said wireless signal;
   determining a first channel estimate for the communication channel based on a first channel length and said wireless signal;
   determining a second channel length that optimizes a channel estimation quality criterion using said first channel estimate and said wireless signal at the channel length determination unit;
   determining a second channel estimate for the communication channel based on the second channel length at the channel estimator,
   wherein determining the second channel length includes iterating through a plurality of channel lengths to identify a channel length that optimizes the channel estimation quality criterion; and
   outputting said second channel estimate.

2. The method of claim 1, wherein:
   said first channel length is a maximum expected channel length of the communication channel.

3. The method of claim 1, wherein:
   determining the second channel length includes estimating channel tap variances using said first channel estimate.

4. The method of claim 1, wherein:
   determining the second channel length includes estimating an input noise associated with the communication channel.

5. The method of claim 1, wherein:
   determining the second channel length includes determining a combination of channel length and sample timing that optimizes the channel estimation quality criterion.

6. The method of claim 5, wherein:
   determining the second channel length includes iterating through a plurality of different combinations of channel length and sample timing to identify a combination that optimizes the channel estimation quality criterion.

7. The method of claim 1, wherein:
   determining the first channel estimate for the communication channel includes using a training sequence received from the communication channel.

8. The method of claim 7, wherein:
   determining the second channel estimate for the communication channel includes using the training sequence received from the communication channel.

9. The method of claim 1, wherein:
   said channel estimation quality criterion is related to a channel estimation error.

10. A method for determining a channel estimate for a communication channel comprising:
    inderendently receiving a wireless signal at each of a channel estimator and a channel length determination unit;
    determining a first channel estimate for the communication channel based on a first channel length and the received wireless signal at the channel estimator;
    estimating channel tap variances for the communication channel using the first channel estimate, the received wireless signal, and a plurality of previous channel estimates at the channel length determination unit;
    estimating noise power for the communication channel using the first channel estimate at the channel length determination unit;
    determining, using said estimated channel tap variances and said noise power, a value for at least one channel related parameter that optimizes a channel estimation quality criterion at the channel length determination unit, said at least one channel related parameter including channel length;
    determining a second channel estimate based on the value of the at least one channel related parameter at the channel estimator,
    wherein determining a value includes iterating through a plurality of channel length values to find a channel length value that results in a best channel estimation quality; and
    outputting said second channel estimate.

11. The method of claim 10, wherein:
    said first channel length is a maximum expected channel length of the communication channel.

12. The method of claim 10, wherein:
    estimating the channel tap variances includes estimating variances using channel estimates corresponding to N most recent time frames in a TDMA system, said channel estimates each being determined based on said first channel length.

13. The method of claim 10, wherein:
    determining the at least one channel related parameter value, includes determining a combination of a channel length value and a sample timing value that optimizes the channel estimation quality criterion.

14. The method of claim 10, wherein:
    determinig the at least one channel related parameter value, includes iterating through a plurality of combinations of channel length and sample timing to find a combination that results in a best channel estimation quality.

15. A receiver comprising:
    a channel estimator to determine an initial channel estimate for a communication channel using a signal received from the communication channel, said channel estimator determining said initial channel estimate based on a first channel length; and
    a channel length determination unit to determine a second channel length for use in determining a revised channel estimate for the communication channel that is more accurate than the initial channel estimate, said channel length determination unit using said initial channel estimate and said received signal to determine said second channel length and to output said second channel length, wherein each of said channel estimator and said channel length determination unit independently receives said received signal, and wherein said channel length determination unit includes an iteration unit to iterate through a plurality of channel length values to find a channel length value that optimizes a channel estimation quality criterion.

16. The receiver of claim 15, wherein:

said first channel length is a maximum expected channel length.

17. The receiver of claim 15, wherein:

said channel length determination unit includes an iteration unit to iterate through a plurality of combinations of channel length and initial sample timing to find a combination that optimizes a channel estimation quality criterion.

18. The receiver of claim 15, wherein:

said channel length determination unit includes a channel tap variance estimator to estimate channel tap variances using said initial channel estimate.

19. The receiver of claim 15, wherein:

said channel length determination unit includes a channel noise estimator to estimate channel noise power using said initial channel estimate.

20. A receiver comprising:

a channel estimator to determine a channel estimate for a communication channel using a signal received from the communication channel; and a channel length determination unit that receives said received signal and that includes:

a channel tap variance estimator to estimate channel tap variances associated with the communication channel;

a noise estimator to estimate a noise power associated with the communication channel; and an iteration unit to determine, using said estimated channel tap variances and said estimated noise power, a value for at least one parameter for use by the channel estimator to determine said channel estimate, said at least one parameter including channel length, wherein said iteration unit iterates through a plurality of channel length values to find a channel length value that optimizes a channel estimation quality criterion, the iteration unit to output said at least one parameter value, wherein each of said channel estimator and said channel length determination unit independently receives said received signal.

21. The receiver of claim 20, wherein:

said iteration unit iterates through a plurality of combinations of channel length and initial sample timing to find a combination that optimizes a channel estimation quality criterion.

* * * * *

UNITED STATES PATENT AND TRADEMARK OFFICE
CERTIFICATE OF CORRECTION

| | |
|---|---|
| PATENT NO. | : 7,305,050 B2 |
| APPLICATION NO. | : 10/145432 |
| DATED | : December 4, 2007 |
| INVENTOR(S) | : Eyal Krupka |

It is certified that error appears in the above-identified patent and that said Letters Patent is hereby corrected as shown below:

Column 6, Line 60      Delete "c enter" and insert -- center --
Column 10, Line 10     Delete "inderendently" and insert -- independently --

Signed and Sealed this

Sixth Day of May, 2008

JON W. DUDAS
*Director of the United States Patent and Trademark Office*